Figure 1:
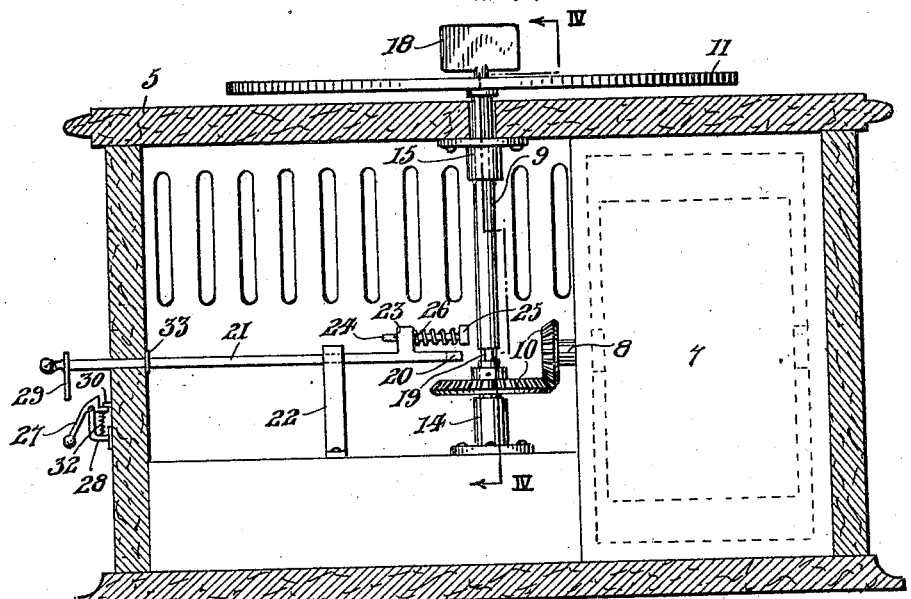

K. WOJTASIEWICZ.
PHONOGRAPH.
APPLICATION FILED FEB. 10, 1921.

1,401,849.

Patented Dec. 27, 1921.
2 SHEETS—SHEET 1.

Inventor
K. Wojtasiewicz

By J. K. Bryant.
Attorney

K. WOJTASIEWICZ.
PHONOGRAPH.
APPLICATION FILED FEB. 10, 1921.

1,401,849.

Patented Dec. 27, 1921.
2 SHEETS—SHEET 2.

Inventor
K. Wojtasiewicz
By F. N. Bryant
Attorney

UNITED STATES PATENT OFFICE.

KAZIMIERZ WOJTASIEWICZ, OF CLEVELAND, OHIO.

PHONOGRAPH.

1,401,849.  Specification of Letters Patent.  Patented Dec. 27, 1921.

Application filed February 10, 1921. Serial No. 443,903.

*To all whom it may concern:*

Be it known that I, KAZIMIERZ WOJTASIEWICZ, a citizen of Poland, residing at Cleveland, in the county of Cuyahoga and State of Ohio, have invented certain new and useful Improvements in Phonographs, of which the following is a specification.

This invention relates to certain new and useful improvements in phonographs and has particular reference to an improved stop or brake mechanism for the turn tables of phonographs.

The primary object of this invention is to provide an improved form of stop mechanism for phonographs which will be effective in operation as well as durable and simple in construction and capable of being readily employed by persons not unusually skilled mechanically.

The invention broadly resides in a stop mechanism including a friction stop member and a positive stop member coöperatively associated so as to enable the turn table to be brought to a stop by the friction means and then immediately positively held in stopped position by the positive stopping means.

The invention also embodies a friction member which is of spring pressed form and which is provided with an actuating mechanism associated with a retaining means or latch for effectively holding the positive stop means in stopping position, the retaining means being readily releasable for permitting turning of the phonograph turn table when desiring to play records.

The preferred embodiment of the invention is illustrated in the accompanying drawings forming part of this specification and wherein like reference characters indicate corresponding parts throughout the several views.

Figure 2:
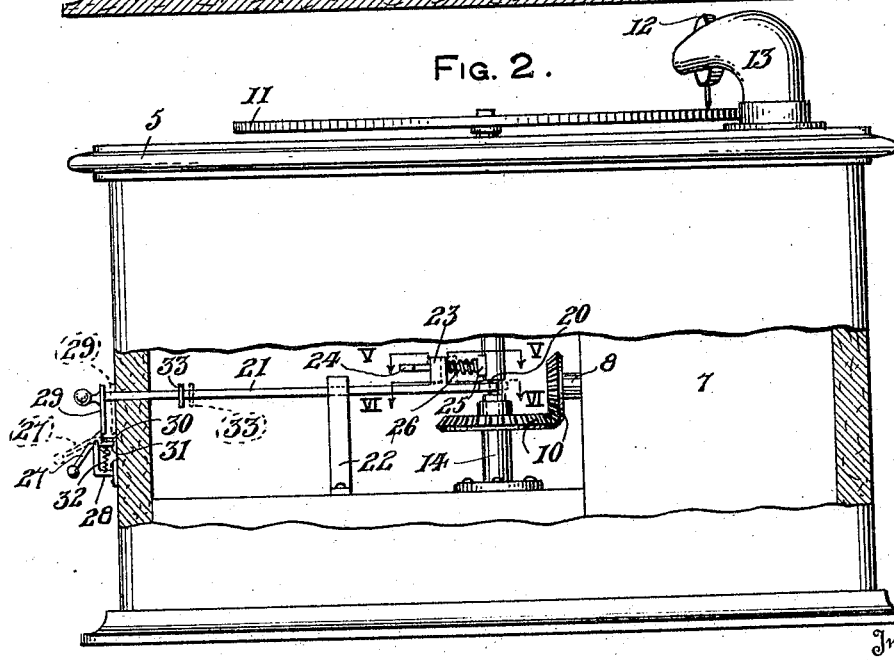
Figure 3:
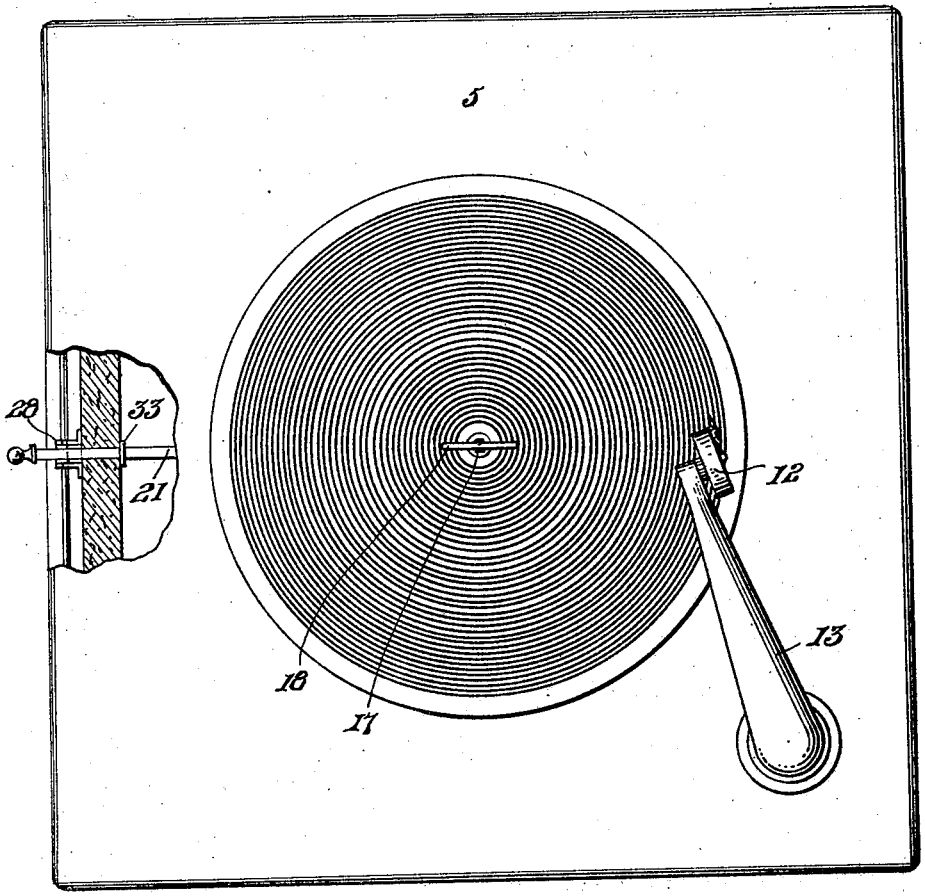
Figure 4:
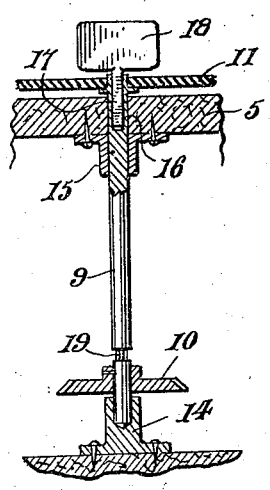
Figure 5:
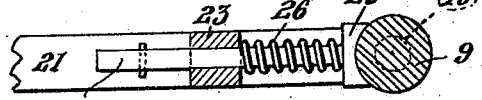
Figure 6:
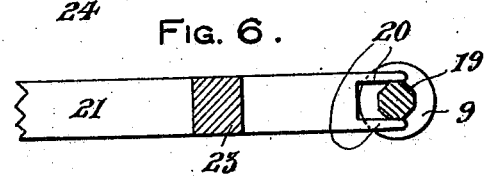
Figure 7:
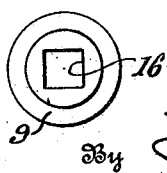

In the drawings,

Figure 1 is a substantially central transverse sectional view of a phonograph constructed in accordance with the present invention, and showing the brake mechanism in released position and with the winding key in position, Fig. 2 is a view of the device shown in Fig. 1, partly in rear elevation, and partly broken away so as to reveal the brake mechanism in braking position, the catch and brake operating means being illustrated by dotted lines in the position prior to its release and the winding key being omitted or removed, Fig. 3 is a top plan view of the device shown in Fig. 1 with the casing or cabinet of the phonograph broken away to reveal the outer end of the brake operating member and the latch thereof, Fig. 4 is a vertical sectional view taken upon line IV—IV of Fig. 1, Fig. 5 is a horizontal sectional view taken substantially upon line V—V of Fig. 2, Fig. 6 is a similar view taken upon line VI—VI of Fig. 2, and Fig. 7 is an enlarged top plan view of the vertical shaft which carries the turn table.

Referring more in detail to the several views, the present invention contemplates the provision of improved brake or stop mechanism for phonographs which may embody the usual casing or cabinet structure 5 with a spring motor 7 suitably mounted therein and provided with a horizontal drive shaft 8 geared to the lower end of a vertical shaft 9 by means of bevel gears 10, the upper end of shaft 9 being extended through the top wall of the casing 5 and having the usual turn table 11 mounted thereon in horizontal position so that when a record is placed upon said turn tab'e as shown in Fig. 3, the groove of the record may be engaged in the usual manner by the needle of the sound box 12 which is connected with the tone arm 13. The tone arm 13 may be extended to the interior of the casing 5 for communication with the usual amplifier found in devices of this kind and not shown in the drawings as the same does not form any part of the present invention.

The lower end of the shaft 9 is journaled in a thrust bearing 14 which is fixed near the bottom of the casing 5, and another bearing 15 is fixed to the under side of the top wall of the casing 5 with the shaft 9 extending therethrough and journaled therein.

The upper end of the vertical shaft 9 is provided with a square or other angular socket 16 for detachable reception of a similarly shaped shank 17 of a winding key 18, whereby the motor 7 may be rewound when necessary upon release of the brake mechanism to be described, The shaft 9 is provided with an angular portion 19 just above the horizontal gear 10 for engagement at opposite sides by means of the fork 20 which is formed on the inner end of a rod slidably mounted for movement transversely of the casing 5 in a side wall of the latter and in a brake 22 suitably mounted within the casing.

The rod 21 is provided with a laterally extending lug 23 near the fork end of the same, and a stem 24 is slidably mounted through this lug for movement longitudinally of the rod 21. An arcuate brake shoe 25 is rigid with the inner end of the stem 24 and is yieldingly urged toward the shaft 9 by means of a spring 26 which is interposed between the lug 23 and the shoe 25 and which is mounted upon the stem 24, the spring 26 being of such size as to project the shoe 25 a distance inwardly beyond the fork 20 so that when the rod 21 is forced inwardly, the shoe 25 will frictionally engage the shaft 9 so as to gradually bring the latter to a stop, whereupon further inward movement of the rod 21 will cause engagement of the fork 20 with the angular portion 19 of said shaft 9 for positively holding the latter against turning movement. Means is provided for retaining the rod 21 in its inwardly slid position against the action of the spring 26, and this means includes a pivoted catch 27 carried by a suitable bracket 28 which is fixed to the side wall of the casing 5 exteriorly of the latter and below the rod 21, the catch 27 including a lip behind which a depending plate is adapted to be engaged, the plate or arm 29 being rigid with the outer end of the rod 21. The catch 27 is so positioned as to permit further inward movement of the rod 21 after the member 29 is engaged behind said catch whereby the latter may be tilted for releasing the rod 21 upon such further inward movement. Release of the catch without this preliminary inward movement of the rod is prevented by interengaging members 30 and 31 respectively provided upon the casing 5 and the catch 27, and these members 30 and 31 are normally engaged by means of a spring 32 interposed between the lower arm of the bracket 28 and the lug or member 31 of the catch 27.

The depending arm member 29 will limit the inward movement of the rod 21, and a collar 33 is preferably provided upon said rod for engagement with the inner face of the adjacent side wall of the casing 5 for limiting the outward movement of said rod.

In operation, the parts are normally disposed as shown in Fig. 2 with the fork 20 engaging the angular portion 19 of the shaft 9 and with the friction brake shoe 25 engaging the cylindrical portion of the shaft 9, the parts being held in this position by engagement of the arm 29 behind the lip of the catch 27. After the record has been placed upon the turn table 11, the outer end of the catch 27 is engaged by the finger of the operator so as to tilt the catch upwardly as indicated by dotted lines in Fig. 2, the rod 21 being urged inwardly as indicated by dotted lines in said figure until the lip of the catch 27 disengages from the arm 29. The rod 21 is then forced outwardly through the action of the spring 26 sufficiently to not only disengage the fork 20 from the shaft portion 19, but to also disengage the shoe 25 from the shaft 9. The motor 7 then turns the turn table 11 in the usual manner for playing the record. When the record has been played and it is desired to bring the turn table to a stop, the rod 21 is pressed inwardly so as to first bring the shoe 25 into engagement with the shaft 9 so as to practically bring said shaft to a stop, and upon further inward movement of the rod 21, the fork 20 engages the angular portion of the shaft 9 and positively holds the same against turning. Simultaneously with the engagement of the fork 20 with the shaft portion 19, the arm 29 snaps past the catch 27 and the rod 21 is thus effectively held with its fork engaged with the shaft portion 19 until again released as above described.

It will thus be seen that I have provided an extremely simple and efficient form of stop or brake mechanism for phonographs which may be cheaply and easily manufactured and be readily placed in use.

What is claimed as new is:—

1. In a phonograph wherein records are played upon a turn table mounted upon a vertical driven shaft, means for arresting the rotation of such vertical shaft and for positively holding it against rotation including the combination with cylindrical and angular portions of said shaft of coöperatively related friction and positive shaft engaging members adapted to respectively engage the cylindrical and angular shaft portions whereby the shaft is brought to a stop first by the friction member and then held against rotation by the positive means.

2. A stop mechanism for phonographs comprising in combination with the vertical turn table shaft having adjacent cylindrical and angular portions, of a slidably mounted member movable toward and away from said shaft and provided with means upon its inner end for engaging the angular portion of the shaft to positively hold the latter against turning, and means upon the inner end of said slidable member normally disposed to frictionally engage the cylindrical portion of the shaft prior to the engagement of the first named means with the angular portion of said shaft, said friction means being yieldable for permitting engagement of the first named means upon continued inward movement of said slidable member, 3. A stop mechanism for phonographs comprising in combination with the vertical turn table shaft having adjacent cylindrical and angular portions, of a slidably mounted member movable toward and away from said shaft and provided with means upon its inner end for engaging the angular portion of the shaft to positively hold the latter against turning, means upon the inner end of said slidable member normally disposed to frictionally engage the cylindrical portion of the shaft prior to the engagement of the first named means with the angular portion of said shaft, said friction means being yieldable for permitting engagement of the first named means upon continued inward movement of said slidable member, and releasable means for maintaining the slidable member in its innermost position.

4. A stop mechanism for phonographs comprising in combination with the vertical turn table shaft having adjacent cylindrical and angular portions, of a slidably mounted member movable toward and away from said shaft and provided with means upon its inner end for engaging the angular portion of the shaft to positively hold the latter against turning, means upon the inner end of said slidable member normally disposed to frictionally engage the cylindrical portion of the shaft prior to the engagement of the first named means with the angular portion of said shaft, said friction means being yieldable for permitting engagement of the first named means upon continued inward movement of said slidable member, releasable means for maintaining the slidable member in its innermost position, said last named means comprising a depending arm rigid with the slidable member, and an upwardly tiltable catch behind which said arm is engageable.

5. A stop mechanism for phonographs comprising in combination with the vertical turn table shaft having adjacent cylindrical and angular portions, of a slidably mounted member movable toward and away from said shaft and provided with means upon its inner end for engaging the angular portion of the shaft to positively hold the latter against turning, means upon the inner end of said slidable member normally disposed to frictionally engage the cylindrical portion of the shaft prior to the engagement of the first named means with the angular portion of said shaft, said friction means being yieldable for permitting engagement of the first named means upon continued inward movement of said slidable member, releasable means for maintaining the slidable member in its innermost position, said last named means comprising a depending arm rigid with the slidable member, an upwardly tiltable catch behind which said arm is engageable, and means to prevent disengagement of the arm from the catch except upon further inward movement of the slidable member when the catch is upwardly tilted.

6. A phonograph stop mechanism comprising in combination with a vertical turn table carrying shaft having adjacent cylindrical and angular portions, a rod slidably mounted for movement toward and away from said shaft and having means upon its inner end arranged to engage the angular portion of said shaft to positively retain the same against rotation, friction means upon the inner end of said rod normally spring pressed for engaging the cylindrical portion of the shaft prior to engagement of the first named means with the angular portion of said shaft, and means to releasably retain the rod in inwardly slid position with the first named means engaging said angular portion of the shaft.

7. In combination with a driven shaft, correlated positive and friction brake members having means for causing engagement of the shaft by the friction means prior to engagement of the same by the positive means, and a single operating member for simultaneously moving the friction and positive brake means into and out of engagement with said shaft.

8. In combination with a driven shaft, correlated positive and friction brake members having means for causing engagement of the shaft by the friction means prior to engagement of the same by the positive means, a single operating member for simultaneously moving the friction and positive brake means into and out of engagement with said shaft, the friction brake means including a yieldable brake shoe, and means to retain the positive brake means in engagement with the shaft with the friction brake means under compression.

9. The combination with a rotatable shaft having adjacent cylindrical and angular portions, a rod slidably mounted for movement toward and away from said shaft and having a fork upon its inner end adapted for engagement with the angular shaft portion, a lateral lug upon said rod, a slidable stem movable longitudinally of the rod through said lug, a friction brake shoe upon the inner end of said stem, a spring interposed between the lug and the brake shoe for normally projecting the latter inwardly of the fork, and means to slidably move said rod toward and away from said shaft.

10. The combination with a rotatable shaft having adjacent cylindrical and angular portions, a rod slidably mounted for movement toward and away from said shaft and having a fork upon its inner end adapted for engagement with the angular shaft portion, a lateral lug upon said rod, a slidable stem movable longitudinally of the rod through said lug, a friction brake shoe upon the inner end of said stem, a spring interposed between the lug and the brake shoe for normally projecting the latter inwardly of the fork, means to slidably move said rod toward and away from said shaft, and means to releasably retain the rod in its inwardly slid position.

In testimony whereof I affix my signature in presence of two witnesses.

KAZIMIERZ WOJTASIEWICZ.

Witnesses:
 WIMENTY SIEMIENIC,
 LEO PAPIERSKI.